Aug. 13, 1963 J. G. DUFFEY 3,100,685
METHOD OF RECOVERING CARBON DIOXIDE
Filed Oct. 30, 1959
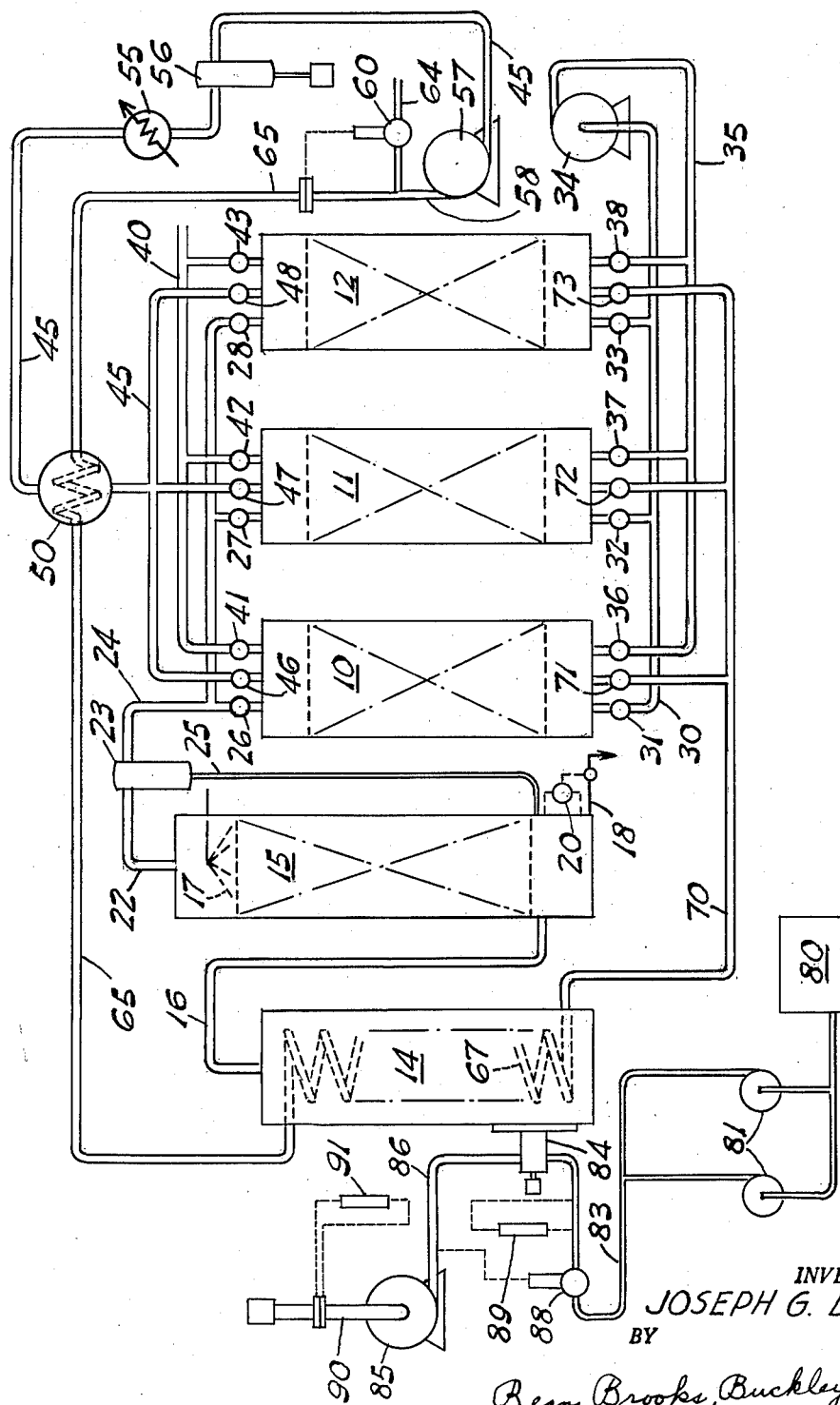
INVENTOR.
JOSEPH G. DUFFEY
BY
Bean, Brooks, Buckley & Bean
ATTORNEYS

United States Patent Office 3,100,685
Patented Aug. 13, 1963

3,100,685
METHOD OF RECOVERING CARBON DIOXIDE
Joseph G. Duffey, Tonawanda, N.Y., assignor to
Arnold Equipment Corporation, Buffalo, N.Y.
Filed Oct. 30, 1959, Ser. No. 849,805
10 Claims. (Cl. 23—150)

This invention relates to a method of and apparatus for producing relatively pure carbon dioxide by separation thereof from a mixture of gases containing the same.

In the practical prior art the most common method, in fact the method used almost universally in producing $CO_2$ for commercial purposes, comprises an absorption system wherein the $CO_2$ of a combustion gas starting mixture of gases is absorbed in a water solution of monoethanolamine, sodium carbonate or potassium carbonate, and subsequently recovered therefrom by application of heat. These methods are more costly and more cumbersome than the novel adsorption system which comprises the method and apparatus of the present invention. For one thing, the absorbents employed in prior art separation and purifying processes are often quite expensive and are consumed or evaporated to a greater or lesser extent in these prior art processes. Furthermore, the $CO_2$ produced by the method and apparatus of the present invention is of greater purity that that produced by prior art methods because no liquids are brought into contact with the $CO_2$, as in the absorption systems of the prior art. For instance, in the case of absorption in a water solution of monoethanolamine, liquids may carry over into the $CO_2$ and produce amine contamination of the $CO_2$ or other impurity thereof.

Speaking generally, in proceeding in accordance with a preferred form of the method of the present invention, a mixture of fuel oil, natural gas or other hydrocarbon and air is burned to produce a gaseous mixture consisting almost entirely of nitrogen, carbon dioxide and water. Small traces of other gases may be present in the products of combustion, mainly carbon monoxide. The gaseous mixture is then cooled and passed through one of a series of towers containing a $CO_2$ adsorbing material, a preferred adsorbent being a material of the molecular sieve type, more specifically, an adsorbent which may be referred to as a synthetic zeolite.

A fuller disclosure of the presently preferred adsorbent material, which comprises a crystalline synthetic sodium-aluminum-silicate, may be found in United States Letters Patent Nos. 2,882,243 and 2,882,244 to Robert M. Milton, dated April 14, 1959. While the embodiment of the present invention disclosed herein by way of example refers specifically to the foregoing molecular sieve adsorbent, other adsorbent materials having equivalent physical adsorptive properties with respect to carbon dioxide may be employed in practicing the teachings and principles of the present invention.

A particular feature of novelty of the present method and apparatus resides in the manner in which the adsorbed $CO_2$ is subsequently desorbed from the molecular sieve. A more or less closed fluid circuit is established which includes the molecular sieve and also includes fluid displacement means and a proportioning valve arrangement which diverts a portion of the gas in the closed fluid circuit from such fluid circuit.

This diverted portion comprises the $CO_2$ which is delivered from the system for utilization or further processing or treatment in any desired manner. The undiverted portion is heated and passed back to and through the molecular sieve by means of the aforesaid fluid displacement means. This heats the molecular sieve and the $CO_2$ adsorbed therein, whereupon the adsorbed $CO_2$ is desorbed and passes out of the molecular sieve with the heated $CO_2$ which is flowing therethrough.

It is thus seen that the $CO_2$ adsorbed in the molecular sieve is heated and discharged therefrom by forced fluid flow in such manner that no extraneous contaminating gases or other fluids come in contact therewith.

In the initial adsorption phase substantially the entire unadsorbed component of the combustion gas starting material comprises dry nitrogen which passes from the molecular sieve in the adsorption stage, the moisture present in the starting mixture being adsorbed with the $CO_2$. In the method and apparatus of the present invention this unadsorbed dry nitrogen which is relatively cool, is passed through a companion molecular sieve which has just been subjected to the desorption phase and is accordingly at high temperature.

Thus the relatively cool waste nitrogen from the adsorption phase of one molecular sieve is utilized to cool a molecular sieve from which a charge of $CO_2$ has been desorbed so that such companion molecular sieve is brought to the proper temperature for a subsequent adsorption phase of operation without rewetting the same and by utilizing the large quantities of relatively cool, dry nitrogen which are produced in the adsorption phase and are not otherwise desired.

A preferred form of the method and apparatus of the present invention is disclosed in the following specification and illustrated schematically in the accompanying drawing but it is to be understood that this preferred embodiment is by way of example only and that various modifications in the method and apparatus may be made without departing from the principles of the invention and the spirit and scope thereof is not limited otherwise than as defined in the appended claims.

The single FIGURE of the drawing is a schematic or diagrammatic representation of one form of the apparatus of the present invention which may be employed in practicing the novel method of the invention.

In the diagrammatic figure which comprises the drawing the numerals 10, 11 and 12 designate three identical towers which are employed sequentially in separating and collecting $CO_2$ and subsequently delivering the same for various uses and purposes. Each of the towers contains a body of molecular sieve of the type more fully identified earlier herein, the same being generally in pellet form. This material has a marked ability to adsorb carbon dioxide but will pass nitrogen and other usual gases which may be present in very small quantities in the products of combustion which comprise the starting material in the present method.

In the form of the method and apparatus of the present invention which is set forth herein by way of example means are provided for burning a mixture of fuel oil, natural gas or other hydrocarbon and air, a combustion chamber for this purpose being designated 14 in the drawing. From the combustion chamber 14 the products of combustion are conducted to a cooling tower 15 by a conduit 16 as in conventional cooling towers. The tower 15 preferably contains a body of surface contact rings or members.

In the coling tower 15 the combustion products are passed upwardly and a spray of cooling water passes downwardly from a spray head 17 and discharges from the cooling tower through a drain conduit 18. A liquid level controller 20 maintains the water level in the base of tower 15 above the drain conduit 18 and below the point of entry of conduit 16 to provide a water seal to prevent the combustion gases from discharging through the drain conduit 18.

The cooled gases pass upwardly from cooling tower 15 through a conduit 22, through a water separator 23, and thence through a manifold conduit 24 which leads to all three of the towers 10, 11 and 12. Water separated from the combustion gases in the separator 23 is returned to the base of the cooling tower 15 by a conduit 25. The portions of manifold conduit 24 which lead to the upper ends of the collection towers 10, 11 and 12 are controlled by valves designated 26, 27 and 28, respectively.

A discharge manifold conduit 30 leads from the bottom ends of the towers 10, 11 and 12 by way of control valves designated 31, 32 and 33, respectively, to a blower 34, and thence back through a maniofld 35 leading into the bottoms of the towers 10, 11 and 12 by way of valves designated 36, 37 and 38, respectively.

A second discharge manifold leads from the upper ends of the towers 10, 11 and 12, the same being designated 40 in the drawing, and communication of discharge conduit 40 with the towers 10, 11 and 12 is controlled by valves designated 41, 42 and 43. A third discharge manifold 45 likewise leads from the upper ends of the towers 10, 11 and 12, communication therewith being controlled by valves designated 46, 47 and 48, respectively.

Manifold conduit 40 discharges to the atmosphere while manifold conduit 45 leads through a heat exchanger 50, presently to be described in greater detail, and thence to delivery and recirculating means which will now be described. After passage through the heat exchanger 50 manifold conduit 45 leads to a water cooled heat exchanger 55, thence to a water separator 56 and a booster compressor 57.

As will appear from a fuller description of the operation of the present method and apparatus later herein, carbon dioxide initially separated out in one or another of the towers 10, 11 or 12 is thus delivered to booster compressor 57 and the discharge conduit therefrom, designated 58, leads to a flow recorder and controller 60 which proportions the flow thereof and delivers a portion of the $CO_2$ to a conventional $CO_2$ liquefying apparatus or other processing or $CO_2$ utilizing means by way of a conduit 64 and returns a predetermined proportion of the $CO_2$ to the present system, for purposes which will presently appear, by way of a conduit 65.

The $CO_2$ in conduit 65 passes through heat exchanger 50 in heat exchange relation with the $CO_2$ which passes through manifold conduit 45 before the conduit 45 passes to the proportioning and delivery apparatus just described. Since the $CO_2$ passing from a tower through manifold 45 is hot and must be cooled, and since $CO_2$ passing from the proportioning means 60 through conduit 65 for return to one of the towers is to be heated, for purposes which will presently appear, the heat exchanger 50 takes otherwise waste heat from the one and transfers it to the other to lessen the amount of extraneous heating and cooling required by the gases in the two conduits.

From heat exchanger 50 conduit 65 leads to a heat exchange coil 67 in combustion chamber 14 and the output end of coil 67 connects with a manifold conduit 70 which leads to the lower ends of the towers 10, 11 and 12, communication therewith being controlled by valves designated 71, 72 and 73, respectively, in the drawing.

The apparatus for supplying a burnable mixture of fuel oil, natural gas or other hydrocarbon and air to the combustion chamber 14 is generally conventional and is set forth herein merely by way of fully disclosing a fully operative system for performing the method of the present invention. In the drawing the numeral 80 designates a fuel oil tank and a pair of pumps 81 operate alternatively to deliver fuel oil from tank 80 to a fuel oil supply line 83 which leads to an inlet or mixing chamber 84 at the base of combustion chamber 14.

An air blower 85 delivers air under pressure to an air supply line 86 which likewise connects with inlet chamber 84 of the combustion chamber. A conventional ratio flow controller is connected across the fuel oil supply line 83 and the air line 86 as indicated at 88 to deliver properly proportioned quantities of fuel oil and air to the inlet or mixing chamber 84 of the combustion chamber 14 and the numeral 89 designates a flow meter for indicating the rate of consumption of fuel oil. For informational and control purposes, the air intake conduit of blower 85, designated 90 in the drawing, is likewise provided with a flow meter as indicated at 91.

Each of the towers 10, 11 and 12 containing the molecular sieve material identified above performs the same succession of method steps. Each of the three towers 10, 11 and 12 has three phases or steps in its cycle of operation, namely a carbon dioxide absorbing phase, a carbon dioxide desorbing phase, and a cooling phase. The three phases of each of the towers 10, 11 and 12 are staggered with respect to each other so that when one tower is adsorbing, another is desorbing, and the third is being cooled in preparation for another adsorbing step.

By way of illustration, let us assume that the tower 10 is in the adsorption phase, the tower 11 in the desorption phase, and the tower 12 in the cooling phase. In this stage of operation valves 26, 47, 43, 31, 72 and 38 will be open. The remaining valves communicating directly with the tops and bottoms of the towers 10, 11 and 12 are all closed, namely valves 46, 41, 27, 42, 28, 48, 71, 36, 32, 37, 33 and 73.

Combustion gases from the combustion chamber 14 pass through conduit 16, cooling tower 15, conduits 22 and 24 to the top of tower 10 through valve 26, thence downwardly through the molecular sieve in the tower 10 and out through valve 31 and manifold conduit 30. Since the gases are traveling at fairly substantial rates in this phase of the operation, the downward flow through tower 10 avoids the severe agitation and disturbance of the pellets making up the molecular sieve which would take place if the gas were blown upwardly therethrough.

The carbon dioxide of the combustion gases is adsorbed in the molecular sieve along with any moisture present in the mixture and the nitrogen and traces of other extraneous gases which may be present are discharged through the valve 31 and conduit 30. The flue gas from combustion chamber 14 is cooled to 100° F. in the cooling tower 15 and accordingly the adsorption tower 10 operates at substantially 100° F.

The nitrogen gas thus discharged is likewise at about 100° F. and passes to blower 34 and from there through conduit 35 and the open valve 38 of tower 12 to cool the molecular sieve therein which has been substantially heated in the desorption phase, as will presently appear. The molecular sieve is purged of moisture as well as $CO_2$ in the desorption phase and is therefore dry at the beginning of the cooling phase. Since the moisture is adsorbed from the flue gas along with $CO_2$ in the adsorption phase, the nitrogen gas used for cooling tower 12 is dry and accordingly the molecular sieve in each tower remains dry during cooling. From the cooling tower 12 the nitrogen gas which is thus utilized in the cooling phase passes through open valve 43 thereof and into manifold conduit 40 from which it discharges to the atmosphere.

While tower 10 is adsorbing $CO_2$, tower 11 is desorbing $CO_2$ which it has previously adsorbed, and during this desorption a portion of the $CO_2$ is delivered for ultimate use and another portion is circulated through a heat exchanger and thence back through the tower 11, whereby the molecular sieve material therein and the adsorbed $CO_2$ are heated without contaminating the $CO_2$ with any other gas or other substance. While the gas circuit involved in the desorption phase is a generally closed or continuous circuit, we may begin at the heat exchanger 67 in the combustion chamber 14 wherein a portion of the $CO_2$ desorbed from tower 11 is heated and passed backwardly through manifold 70 and valve 72, thence upwardly through the tower 11 to heat the same and drive off the $CO_2$ and water previously adsorbed therein.

The heating tower 11 liberates carbon dioxide at a temperature of about 600° F., the tower being heated by the recirculating carbon dioxide stream whose temperature has been raised to approximately 900° F. in the heat exchanger 67 of combustion chamber 14. The relatively hot carbon dioxide gas and water passing upwardly out of tower 11 through valve 47 passes to manifold 45 and through heat exchanger 50 where it gives up some of its heat to the $CO_2$ passing to the combustion chamber heat exchanger 67 through conduit 65, as aforesaid.

From heat exchanger 50 the output carbon dioxide passes through the aforesaid water cooled heat exchanger 55 where its temperature is further reduced to about 100° F., through a water separator 56, a booster compressor 57, and to conduit 58, where the flow thereof is proportionately divided by the flow controller 60 so that a portion is delivered from the system through conduit 64 and another portion passes back through conduit 65, through the heat exchanger 50 and thence through the heat exchanger 67 of combustion chamber 14.

Thus a portion of the purified $CO_2$ is continuously delivered back to the system for heating and recirculation through the desorption tower to heat the same and establish a flow of desorbing carbon dioxide therefrom without any possible contamination of the desorbing $CO_2$.

After a given tower has been desorbed of carbon dioxide and water it must be cooled before it is ready to again adsorb carbon dioxide from the mixed combustion gas starting material and this is accomplished as aforesaid, as for instance in tower 12, by forcing upwardly therethrough through valve 38 and out of valve 43 relatively cool, dry nitrogen gas from the adsorption tower, that is, from the tower 10 which is then performing the adsorption phase.

It is believed that those versed in the present art will understand from the foregoing that when the towers 10, 11 and 12 have completed their respective adsorbing, desorbing and cooling phases, the appropriate valves will be opened and closed to set the system for the next phase of operation wherein tower 12 will be the adsorption tower, tower 10 the desorption tower and tower 11 the cooling tower. Following this second phase, a cycle of operation of the apparatus will be completed by setting the valves so that tower 11 adsorbs, tower 12 desorbs, and tower 10 is cooled.

It is to be understood that the several valve reversals involved in conditioning the towers 10, 11 and 12 for the above sequence of operation may be effected manually or by providing automatic valves of any suitable type such as solenoid valves.

Before changing a given tower from adsorption to desorption it is desirable to momentarily purge the same to atmosphere with carbon dioxide by passing the gas through valves 71 and 41, in the case of tower 10, to free the tower of the nitrogen gas which is residual therein when the adsorption flow is stopped by closing the valves 26 and 31.

I claim:
1. A method of recovering substantially pure $CO_2$ which comprises burning a hydrocarbon fuel, cooling the combustion gases produced thereby to about 100° F., passing the same through a body of synthetic zeolite capable of adsorbing $CO_2$ and passing unadsorbed components, and subsequently desorbing the $CO_2$ from said body and passing the same from one end of said body by diverting a portion thereof for delivery from the system, passing the remainder in heat exchange relation with the combustion gases prior to cooling of the latter to heat such remainder to substantially above 600° F., and directing the same back to the other end of said body to flow therethrough and heat the same to about 600° F. and thus promote desorption and maintain a flow from said body of $CO_2$ desorbed by the heating.

2. A method of recovering substantially pure $CO_2$ which comprises burning a hydrocarbon fuel, cooling the combustion gases produced thereby to about 100° F., passing the gases through a synthetic zeolite capable of adsorbing $CO_2$ to adsorb $CO_2$ and pass unadsorbed components, and subsequently desorbing the $CO_2$ from said body by passing a continuous $CO_2$ flow through said body by diverting a portion thereof for delivery from the system, passing the remainder in heat exchange relation with the combustion gases prior to cooling of the latter to heat such remainder to above 600° F., and directing the same back to said body to flow therethrough and heat the same to about 600° F. and thereby continuously augment the flow from said body with $CO_2$ desorbed by the heating.

3. A method of recovering substantially pure $CO_2$ from combustion gases by employing successively a plurality of synthetic zeolite adsorbers capable of adsorbing $CO_2$, said method comprising cooling the gases to about 100° F. and passing them through one of said adsorbers to adsorb $CO_2$ and pass unadsorbed gas, simultaneously desorbing $CO_2$ from a second adsorber having $CO_2$ adsorbed therein by heating the same to about 600° F., and simultaneously cooling a third adsorber which has been heated by the desorption step by passing therethrough the relatively cool unadsorbed gas issuing from the first mentioned adsorber.

4. A method of recovering substantially pure $CO_2$ from combustion gases by employing a plurality of synthetic zeolite adsorbers, capable of adsorbing $CO_2$, said method comprising cooling the gases to about 100° F. and passing them through one of said adsorbers to adsorbe $CO_2$ and water and pass dry unadsorbed gas, simultaneously desorbing $CO_2$ and water from a second adsorber having $CO_2$ adsorbed therein by heating the same to about 600° F., and simultaneously cooling a third adsorber which has been heated by the desorption step by passing therethrough the relatively cool dry unadsorbed gas issuing from the first mentioned adsorber, and continuing the process by continuously subjecting each of said adsorbers to successive adsorbing, desorbing and cooling steps as aforesaid.

5. A method of recovering substantially pure $CO_2$ from combustion gases by employing successively a plurality of syntthetic zeolite adsorbers capable of adsorbing $CO_2$, said method comprising cooling the gases to about 100° F. and passing them through one of said adsorbers to adsorb $CO_2$ and pass unadsorbed gas, simultaneously desorbing $CO_2$ from a second adsorber having $CO_2$ adsorbed therein and passing the same from said body by diverting a portion thereof for delivery from the system, heating the remainder to above 600° F. and directing the same back to said body to heat the same and maintain a flow of $CO_2$ desorbed from said body, and simultaneously cooling a third adsorber which has been heated by the desorption step by passing therethrough the relatively cool unadsorbed gas issuing from the first mentioned adsorber, and continuing the process by continuously subjecting each of said adsorbers to successive adsorbing, desorbing and cooling steps as aforesaid.

6. A method of recovering substantially pure $CO_2$ which comprises burning a hydrocarbon fuel, cooling the combustion gases produced thereby to about 100° F., passing the same through one of a plurality of synthetic zeolite adsorbers capable of adsorbing $CO_2$ to adsorb $CO_2$ and pass unadsorbed gas, simultaneously desorbing $CO_2$ from a second adsorber having $CO_2$ adsorbed therein and passing the same from said body by diverting a portion thereof for delivery from the system, heating the remainder to above 600° F. and directing the same back to said body to heat the same and maintain a flow of $CO_2$ desorbed from said body, and simultaneously cooling a third adsorber which has been heated by the desorption step by passing therethrough the relatively cool unadsorbed gas issuing from the first mentioned adsorber.

7. A method of recovering substantially pure $CO_2$ which comprises burning a hydrocarbon fuel, cooling the combustion gases produced thereby to about 100° F., passing the same through one of a plurality of synthetic zeolite adsorbers capable of absorbing $CO_2$ to adsorb $CO_2$ and past unadsorbed gas, simultaneously desorbing $CO_2$ from a second adsorber having $CO_2$ adsorbed therein and passing the same from said body by diverting a portion thereof for delivery from the system, passing the remainder in heat exchange relation with the combustion gases prior to cooling the latter to heat such remainder to above 600° F., and directing the same back to said body to heat the same and maintain a flow of $CO_2$ desorbed from said body, and simultaneously cooling a third adsorber which has been heated by the desorption step by passing therethrough the relatively cool unadsorbed gas issuing from the first mentioned adsorber.

8. A method of recovering substantially pure $CO_2$ from a mixture of gases at a temperature of about 100° F. comprising passing the gases through a synthetic zeolite adsorber capable of adsorbing $CO_2$ to absorb $CO_2$ and pass unadsorbed gas, simultaneously desorbing $CO_2$ from a second adsorber having $CO_2$ adsorbed therein by heating the same to about 600° F., and simultaneously cooling a third adsorber which has been heated by the desorption step by passing therethrough the relatively cool unadsorbed gas issuing from the first mentioned adsorber.

9. A method of recovering substantially pure $CO_2$ from a mixture of gases at a temperature of about 100° F. comprising passing the gases through a synthetic zeolite adsorber capable of adsorbing $CO_2$ to adsorb $CO_2$ and pass unadsorbed gas, simultaneously desorbing $CO_2$ from a second adsorber having $CO_2$ adsorbed therein by heating the same to about 600° F., and simultaneously cooling a third adsorber which has been heated by the desorption step by passing therethrough the relatively cool unadsorbed gas issuing from the first mentioned adsorber, then subjecting the first adsorber to desorption, the second to cooling and the third to adsorption, and then subjecting the first adsorber to cooling, the second to adsorption, and the third to desorption.

10. Recovering substantially pure $CO_2$ from combustion gases by passing the gases at a temperature of about 100° F. through a body of synthetic zeolite capable of adsorbing $CO_2$ to adsorb $CO_2$ and pass unadsorbed components and then desorbing the $CO_2$ from an end of said body by a process which includes dividing the desorbed $CO_2$ flowing from said end of said body, delivering one of the divided portions from the system, heating the other of the divided portions and directing the same back to the other end of said body to flow therethrough, thus heating said body to about 600° F. to promote $CO_2$ desorption and promoting flow from said body of $CO_2$ desorbed by such heating.

References Cited in the file of this patent

UNITED STATES PATENTS

| | | |
|---|---|---|
| 1,945,407 | Adair et al. | Jan. 30, 1934 |
| 2,017,779 | Vosburgh | Oct. 15, 1935 |
| 2,037,685 | Holden | Apr. 14, 1936 |
| 2,314,827 | Hornet | Mar. 23, 1943 |
| 2,768,058 | Hotchkiss | Oct. 23, 1956 |
| 2,845,409 | Pennington et al. | July 29, 1958 |
| 2,882,244 | Milton | Apr. 14, 1959 |
| 2,906,793 | Rowe et al. | Sept. 29, 1959 |
| 2,967,587 | Steding et al. | Jan. 10, 1961 |
| 3,008,803 | Milton | Nov. 14, 1961 |
| 3,010,789 | Milton | Nov. 28, 1961 |
| 3,012,853 | Milton | Dec. 12, 1961 |